US007805130B2

(12) United States Patent  (10) Patent No.: US 7,805,130 B2
Edwards et al.  (45) Date of Patent: Sep. 28, 2010

(54) MARKETING METHOD

(76) Inventors: Paul Edwards, 62 Parkhurst Blvd., Toronto, Ontario (CA) M4G 2E2; Ian Gregory Smith, 33 Harbour Sq., Suite 2604, Toronto, Ontario (CA) M5J 2G2

( * ) Notice: Subject to any disclaimer, the term of this patent is extended or adjusted under 35 U.S.C. 154(b) by 992 days.

(21) Appl. No.: 11/419,854

(22) Filed: May 23, 2006

(65) Prior Publication Data

US 2007/0123225 A1  May 31, 2007

Related U.S. Application Data

(60) Provisional application No. 60/739,431, filed on Nov. 25, 2005, provisional application No. 60/749,617, filed on Dec. 13, 2005, provisional application No. 60/776,731, filed on Feb. 27, 2006.

(51) Int. Cl.
    *H04M 3/42* (2006.01)
(52) U.S. Cl. .............. 455/414.1; 455/456.1; 455/456.2; 455/456.3
(58) Field of Classification Search .............. 455/414.1, 455/456.1, 456.2, 456.3; 705/14
    See application file for complete search history.

(56) References Cited

U.S. PATENT DOCUMENTS

| 6,505,046 | B1 * | 1/2003 | Baker ....................... 455/456.3 |
| 7,343,317 | B2 | 3/2008 | Jokinen et al. |
| 7,441,203 | B2 | 10/2008 | Othmer et al. |
| 7,603,360 | B2 | 10/2009 | Ramer et al. |
| 2001/0029465 | A1 * | 10/2001 | Strisower ...................... 705/14 |
| 2003/0003929 | A1 * | 1/2003 | Himmel et al. ............. 455/466 |
| 2004/0224693 | A1 * | 11/2004 | O'Neil et al. ............... 455/445 |
| 2006/0094409 | A1 * | 5/2006 | Inselberg ................. 455/414.1 |

OTHER PUBLICATIONS

"SMS in Marketing:: Clickatell Bulk SMS Gateway", http://www.clickatell.com/brochure/sms_industry/marketing.php, Dec. 7, 2004, 1 page.
"SMS Marketing UK Text Message Groups", http://www.txtlocal.com, http://www.txtlocal.com/how.php, http://www.txtlocal.com/cases.php, (2002), 3 pages.
"Fast SMS News and Press Releases", http://www.fastsms.co.uk/info-support/news/fs-items/house-hunters.html, May 6, 2004, 2 pages.
"Mobilito Wireless SMS", http://www.mobilito.ca/en/wireless/coupt.html, at least as early as Feb. 6, 2006, 1 page.
Goldman, Michael H., USPTO Office Communication dated Dec. 16, 2009 in relation to U.S. Appl. No. 11/563,094, filed Nov. 24, 2006 (11 pages).

* cited by examiner

*Primary Examiner*—Nick Corsaro
*Assistant Examiner*—Amanuel Lebassi

(57) ABSTRACT

A server implements a marketing method. The server may receive a wireless call or message originating at a given facility and return a menu of choices particular to that facility. On receiving a choice selected from said menu, the server may return one or more messages with information particular to a part of said given facility. The information may be a marketing incentive, marketing information, or a promotion.

19 Claims, 1 Drawing Sheet

MARKETING METHOD

CROSS-REFERENCE TO RELATED APPLICATIONS

Figure 1:
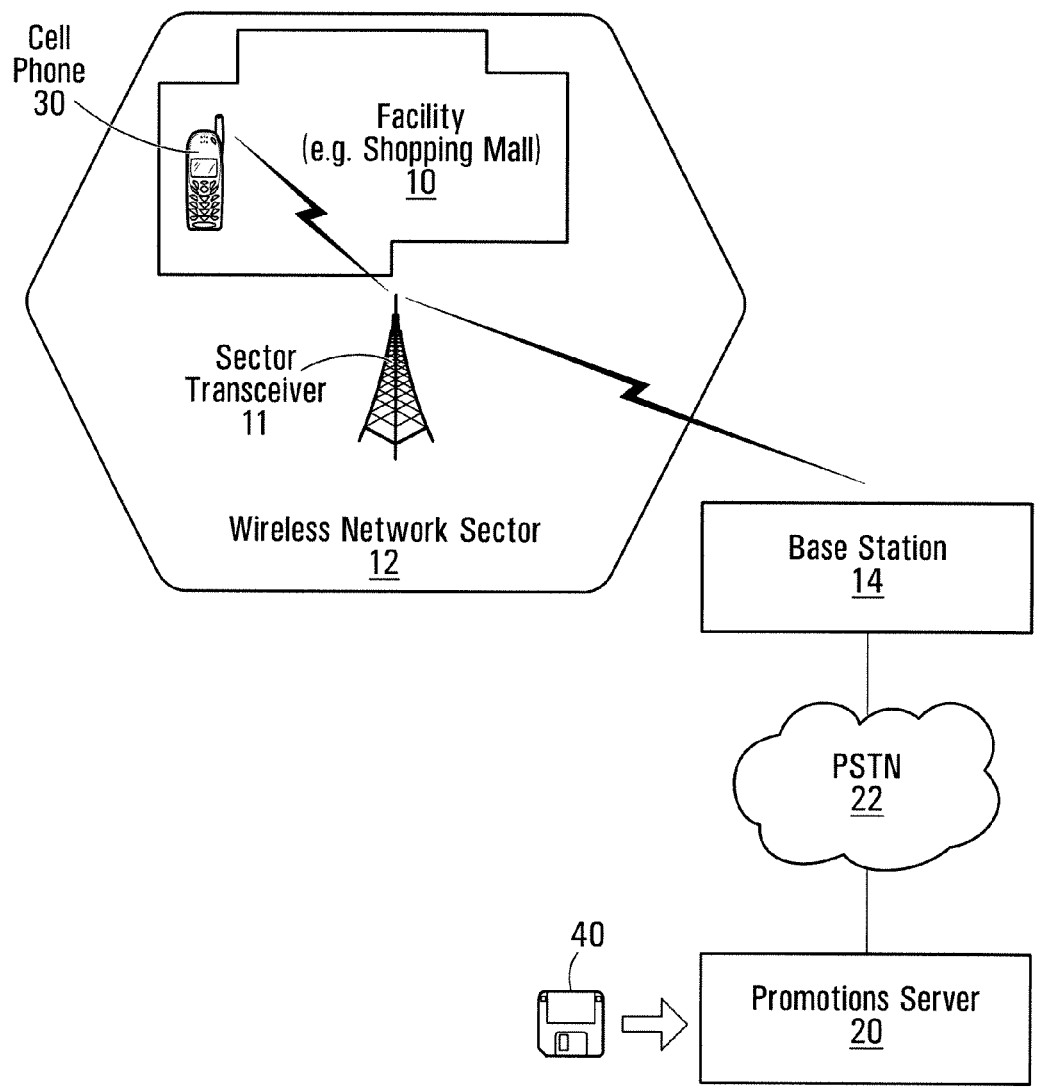

The present application claims the benefit of three prior provisional applications: 1) application Ser. No. 60/739,431, filed Nov. 25, 2005; 2) application Ser. No. 60/749,617, filed Dec. 13, 2005; and 3) application Ser. No. 60/776,731, filed Feb. 27, 2006, the contents of all three provisional applications are hereby incorporated herein by reference.

BACKGROUND

This invention relates to a marketing approach.

Retailers are always looking for new ways to attract customers to their establishment. Traditional methods are becoming less effective as the consumer is becoming increasingly stressed for time, is less tolerant of crowds, and has more demands placed on his or her free time. The mall environment places additional stress on a retailer to differentiate itself amongst the numerous retailers offering similar products and deals.

Accordingly, there is a need for a new method of advertising.

SUMMARY OF INVENTION

A server implements a marketing method. The server may receive a wireless call or message originating at a given facility and return a menu of choices particular to that facility. On receiving a choice selected from said menu, the server may return one or more messages with information particular to a part of said given facility. The information may be a marketing incentive, marketing information, or a promotion.

According to the invention, there is provided a marketing method comprising, at a server: receiving a wireless call or message originating at a given facility; returning a menu of choices particular to that facility; on receiving a choice selected from said menu, returning one or more messages with information particular to a part of said given facility.

According to another aspect of the invention, there is provided a marketing method comprising, at a server: receiving an indication of a cell phone being geographically in a given facility, returning to said cell phone a menu of choices particular to that facility; on receiving a choice selected from said menu, returning a message with information particular to a part of said given facility.

According to a further aspect of the invention, there is provided a computer readable medium containing computer executable instructions which, when executed by a processor of a server cause said server to: on receiving a wireless call or message originating at a given facility, returning a menu of choices particular to that facility; on receiving a choice selected from said menu, returning one or more messages with information particular to a part of said given facility.

Other features and advantages of the invention will become apparent from the following description in conjunction with the drawing.

IN THE DRAWING

FIG. 1 is a schematic diagram of a system configured in accordance with an embodiment of the invention.

DETAILED DESCRIPTION

A consumer shopping mall or other facility may advertise (e.g., through signage) a wireless access number for use in obtaining sales, promotions, information, etc. pertinent to the facility. The access number may be, for example, a short code, such as USHOP (derived from the letters associated with the numbers 87467 on a cell phone keypad) or a star number, such as *49. The number may be specific to the facility of the facility. Alternatively, the number may be common to an area (e.g., across an entire country) if the location of a cell phone calling the number may be determined. This is possible if the cell phone has a GPS locator, or if a cell sector is established for the facility of each facility such that one cell sector provides geographical coverage to the facility of one facility. In the latter instance, a call from the geographic location of the facility results in the call being handled by the cell sector established for that facility and the transmission from the cell phone is augmented by a sector identifier. This sector identifier can be used to identify the facility at the receiving end.

If a user of a wireless phone dials the access number (e.g., short code or * number), the call is directed to a promotions server which returns a menu of choices. Where the facility is a mall, these choices may, for example, represent different retail verticals (i.e., different types of stores in the mall) and/or different specific stores. The menu may be dynamic. A number may be associated with each menu choice. If the user chooses one of these menu choices, the call is again directed to the promotions server and the server returns one or more messages from given stores in the mall. For example, if a menu choice were "Men's Wear", a message may be returned from each participating Men's Wear store in the mall providing their latest offerings, sales, and/or promotions to entice the user into their store. The message may be an oral message, a video message or in some other form, but is preferably a text-based message, such as an SMS message.

Participating stores may send the content of these messages to the promotion server so that they will be included in messages sent to a user requesting promotions for that type of store in the mall. New promotional messages may be sent by the promotional server only for a configurable period of time. The length of this time may be selected by the store requesting the promotional message, or may be pre-set. Thus, these messages can be repeated, updated, changed, or removed in a time sensitive manner. Depending upon the agreed upon program, the retailer may be able to modify their message and its delivery as granularly as each half hour. A fee may be charged back to the store for the privilege of having these messages carried by the promotional server.

A message could include, for example, a promotional code which allows for a discount (and may be time-sensitive) and an indicator of the location of the store in the mall.

After a menu selection is made by a user and a set of one or more messages is returned, for a configurable period of time any new messages received by the promotions server related to the menu choice may be pushed to the user.

The value to the shopper is tremendous: it is a sales aid reminding them of specific sales programs now underway, alerting them to promotions that may not be advertised outside the mall, it conveys time sensitive information, such as 'Happy Hour' Specials in restaurants and bars.

The value to the retailer is even greater as the merchant now has the ability to more actively, in real time, drive extremely qualified traffic to their store. The shopper is in the mall; at that moment and wants to see what you have to offer (this is a permission based solution, so they have asked to receive your information).

FIG. 1 is a schematic of the system for providing poll-based marketing. Turning to FIG. 1, facility 10 is shown to fall within a cell sector 12. The sector transceiver 11 wirelessly communicates with a base station 14. The base station is connected to a promotions server 20 through a public switched telephone network (PSTN) 22. After a user notes a call-in wireless access number associated with the facility, the user may use a cell phone 30 to originate a call to the access number which is terminated at promotions server 20. On receiving the call, which will include an indication of the originating cell sector 12, the promotions server may return a menu of choices related to the facility with the cell sector. Where the facility is a mall, the choices are dependent on the mall type and the types of the stores in the mall. A typical menu could be as follows:

1 Men's Wear & Activities
2 Women's Wear & Activities
3 Children's Wear & Activities
4 Teen's Wear & Activities
5 Restaurants
6 Home & Garden
7 The XYZ Department Store On the user making a selection through cell phone 20 from the menu, the promotions server may return appropriate messages. For example, where the user selects a retail vertical (i.e., one of selections 1 to 6), messages from stores of the selected type are returned. And where a specific store is available for selection and is selected, either one or more messages from the store may be returned or a sub-menu may be served up, listing as selections different departments in the store. Selection of a department would then result in a message from that department of the store. As aforedescribed, in another embodiment, the promotions server does not identify the facility based on the cell sector, but instead on the particular wireless access number used to access the promotions server. The server may be configured to operate as described by computer executable instructions stored on computer readable medium 40 which may be, for example, a non-volatile memory, a file downloaded from a remote source, or a computer disk.

There are several different ways to charge, for example:
1. a straight fee per 'transaction' may be charged; thus, where a customer requests "Women's Wear & Activities", all participating retailers are charge a transaction fee;
2. a fee per 'transaction' is charged as above and, in addition, the retailer may be charged a further fee if the shopper 'drills' down into its advertisement;
3. the merchant may pay a monthly fee dependent upon the number of advertisements over a given period (e.g., per day) and, possibly, the required response time to change these advertisements.

In an alternative embodiment, the number advertised by the facility may be a short message service address. By way of explanation, short message service (SMS) is a service available on digital wireless networks based on a number of different standards for mobile communication: Global System for Mobile Communications (GSM); code division multiple access (CDMA); and time division multiple access (TDMA). A general feature of SMS is that a mobile can receive or submit a short message at any time, independently of whether a voice or data call is in progress. (This is achieved in GSM systems by using the SS7 signaling channel to transmit SMS messages.) Since SMS is a description of a service provided by wireless carriers rather than a description of a method of delivery, methods of delivery differ.

An SMS message is typically structured to include a source address, a destination address, instructions to a short messaging service center (SMSC) (where the message is stored for forwarding when the destination is available), instructions to the mobile, and a message body. An SMS message may be addressed with a phone number or with a carrier-specific short code. To allow inter-carrier operation (at least where methods of delivery are compatible between the carriers), SMS brokers negotiate deals with carriers and provide an interface.

Thus, in this instance, the consumer may send an SMS message addressed to the advertised number (e.g., short code). The message is passed by the SMSC to the promotions server which responds with a menu of choices. In this regard, the portion of an SMS message which includes instructions to the mobile can be used to create the menu of options such that, when a user selects an option, an SMS reply message is sent incorporating the chosen message option, or with a destination address which is dependent upon the chosen menu option. Accordingly, on receiving a reply message, the promotions server may respond with a message providing promotions pertinent to the selected menu choice.

In another embodiment, rather than requiring that a cell phone user dial a number or send an SMS message to receive a menu of choices, the menu of choices may be pushed to the user's cell phone whenever the cell phone is detected to be in the facility of the facility (e.g., a shopping mall). Thus, the menu may be pushed to the cell phone when the cell phone is brought into the facility, provided the cell phone is on. Where a cell sector has been established for the facility, the push may be triggered by the cell phone registering with the sector. More specifically, the sector base station transceiver of the cell sector established for the facility may be configured so that when a cell phone registers with it, the transceiver calls, or sends a message to, the promotions server with the cell phone number of the registering cell phone. The promotions server is thereby prompted to send a message to the registering cell phone and deliver the menu of choices. The cell phone will annunciate the incoming message in the manner in which it annunciates any other incoming message so that the cell phone user may become aware of the incoming message. Operation then proceeds as aforedescribed, with the user receiving further information if he/she selects one of the menu choices (by dialing the phone number associated with the menu choice or sending an SMS message associated with a menu choice, as the case may be).

Other modifications will be apparent to those skilled in the art and, therefore, the invention is defined in the claims.

What is claimed is:

1. A marketing method comprising:
   at a server system:
   receiving from a mobile wireless communications device a wireless call or message;
   determining that said mobile wireless communications device is located at a given shopping facility;
   correlating a menu of choices specific to said given shopping facility with said given shopping facility;
   responsive to said receiving, returning to said wireless communications device information to provision said wireless communications device with said menu of choices;
   subsequent to said returning said information, on receiving from said wireless communications device a choice selected from said menu, returning to said wireless communications device one or more text-based marketing messages, at least one of said text-based marketing messages comprising a marketing incentive particular to a store in said given shopping facility.

2. The method of claim 1 wherein said marketing incentive comprises a promotional code.

3. The method of claim 1 wherein said receiving from a wireless device a wireless call or message comprises receiving said call or message with an associated geographic indication.

4. The method of claim 3 wherein said geographic indication is a GPS location indicator.

5. The method of claim 3 wherein said geographic indication is a cell sector identifier.

6. The method of claim 1 further comprising, subsequent to said returning said one or more text-based marketing messages to said wireless device, receiving updated message content for at least one of said one or more text-based marketing messages.

7. The method of claim 6 further comprising storing at least one updated text-based marketing message based on said message content.

8. The method of claim 7 wherein said updated text-based marketing message replaces one of said one or more text-based marketing messages.

9. The method of claim 6 further comprising returning to said wireless device said at least one updated text-based marketing message.

10. The method of claim 6 further comprising returning to said wireless device said at least one updated text-based marketing message if a time between said receiving a choice selected from said menu and said receiving updated text-based marketing message content is less than a pre-determined time.

11. The method of claim 1 wherein said receiving a wireless call or message comprises receiving a short messaging service message.

12. The method of claim 1 wherein said receiving a wireless call or message comprises receiving a wireless cellular telephone call.

13. The method of claim 12 wherein said wireless cellular telephone call is made to a destination number terminated at said server system and wherein said server system terminates a plurality of destination numbers and wherein said determining that said mobile wireless communications device is located at a given shopping facility comprises identifying said shopping facility by said destination number.

14. The method of claim 1 wherein, said returning to said wireless communications device information to provision said wireless communications device with a menu of choices is further returning information to provision said wireless communications device with a further menu of choices and prior to said further returning, first returning to said wireless device information to provision said wireless communications device with a first menu of choices comprising a list of retail verticals and wherein said further returning is responsive to receiving a choice selected from said first menu.

15. The method of claim 1 wherein said promotional code is time limited.

16. The method of claim 1 wherein said at least one of said messages further comprises an indicator of a location of said store in said shopping facility.

17. The method of claim 1 wherein said menu is a further menu and said choice is a further choice and wherein said returning returns information to provision said wireless communications device with a first menu and, upon selection of a first choice from said first menu, with said further menu.

18. The method of claim 17 wherein said first menu comprises a menu of retail verticals, each retail vertical associated with stores of one type and further comprising arranging a transaction charge to all stores associated with said first choice and arranging a further transaction charge to said store.

19. A computer readable medium containing computer executable instructions which, when executed by a processor of a server cause said server to:
  on receiving a wireless call or message from a mobile wireless communications device, determining that said mobile wireless communications device is located at a given shopping facility, correlating a menu of choices specific to said given shopping facility with said given shopping facility and returning to said wireless communications device information to provision said wireless communications device with said menu of choices;
  subsequent to returning said information, on receiving from said wireless communications de vice a choice selected from said menu, return to said wireless communications device one or more text-based marketing messages, at least one of said messages comprising a marketing incentive particular to a store in said given shopping facility.

* * * * *